S. H. SMITH.
BENDING TONGS.
APPLICATION FILED SEPT. 4, 1909.
946,567.
Patented Jan. 18, 1910.
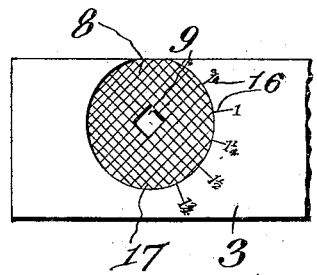
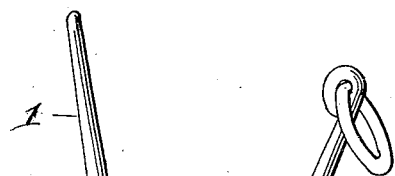
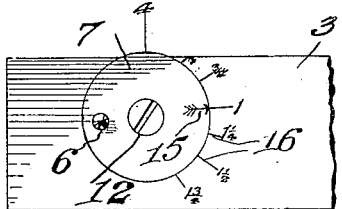
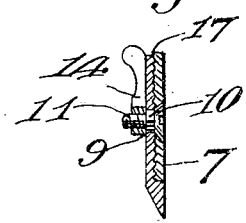
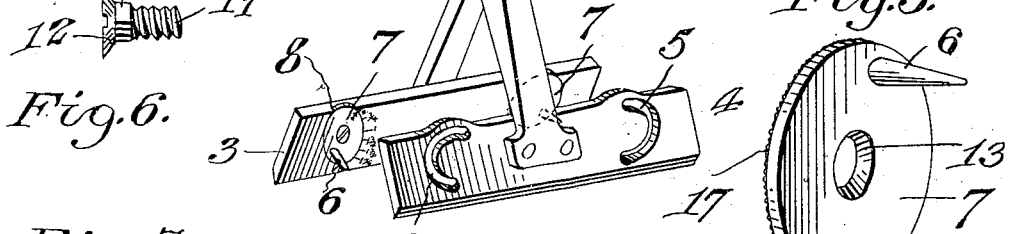
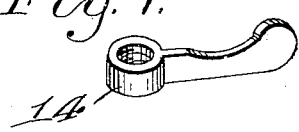
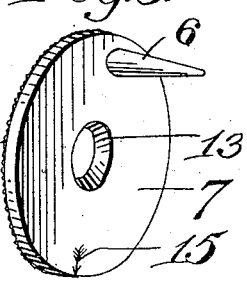
WITNESSES:—
Joe. P. Wahler.
E. M. Ricketts.
INVENTOR
Samuel H. Smith
By Watson E. Coleman
Attorney

---

UNITED STATES PATENT OFFICE.

SAMUEL HERBERT SMITH, OF ATLANTIC CITY, NEW JERSEY.

BENDING-TONGS.

946,567.   Specification of Letters Patent.   Patented Jan. 18, 1910.

Application filed September 4, 1909. Serial No. 516,182.

*To all whom it may concern:*

Be it known that I, SAMUEL HERBERT SMITH, a citizen of the United States, residing at Atlantic City, in the county of Atlantic and State of New Jersey, have invented certain new and useful Improvements in Bending-Tongs, of which the following is a specification, reference being had to the accompanying drawings.

This invention relates to improvements in adjustable roofing tongs used by tinners.

The object of the invention is to provide an improved adjustable gage for the jaws of the tongs whereby a single pair of tongs may take the place of several different sized tongs, and whereby adjustments may be made to produce any width of seam desired.

With the above and other objects in view the invention consists of the novel construction, combination and arrangement of parts hereinafter fully described and claimed, and illustrated in the accompanying drawings in which—

Figure 1 is a perspective view of my improved tongs. Fig. 2 is a detail view of the inner face of one of the jaws of the tongs showing one of the adjustable gages. Fig. 3 is a similar view showing the gage removed. Fig. 4 is a detail section taken on the plane indicated by the line 4—4 in Fig. 2. Fig. 5 is a detail perspective of one of the gages. Fig. 6 is a view of one of the clamping bolts, and Fig. 7 is a view of one of the wing nuts.

The drawings 1 and 2 denote the crossed pivotally connected levers having the usual jaws 3, 4 at their ends. The jaw 4 is formed on opposite sides of its center with arcuate slots 5 which extend transversely of said jaw and which are adapted to receive adjustable gages in the form of pins 6 projecting from disks 7 pivotally and adjustably arranged on the jaw 3. The disks 7 are in the form of circular plates arranged in similar shaped recesses 8 formed in the inner face of the jaw 3, concentric with transverse openings 9. The latter are square or flat faced, as shown in Fig. 3, to receive similar shaped portions 10 on clamping bolts 11. These bolts have flared heads 12 to enter countersunk circular openings 13 formed centrally in the disks or plates 7. The threaded ends of the bolts 11 project beyond the outer face of the jaw 3 and receive wing nuts 14, as clearly shown in Fig. 4.

The gage pins 6 are arranged adjacent to the edges of the disks 7, and at diametrically opposite points of said disks are indicating marks 15 which coact with scale graduations 16 formed on the inner face of the jaw 3 around the recesses 8, the position of the pointer 15 with respect to the graduation mark 16 indicate the adjustment of the gages, and it will be seen that when the nuts 14 are loosened the disks 7 may be readily rotated to position, the gage points 6 at a suitable distance from the edge of the jaw 3 according to the width of seam desired. For the purpose of preventing the disks 7 from slipping when in adjusted position, the bottoms of the recesses 8 are roughened or serrated, as shown at 17, and if desired the inner or opposing faces of the disks 7 may be similarly roughened.

In use, a pair of tongs constructed in accordance with the invention may take the place of seven or eight tongs of different sizes since the gage pins 6 may be quickly and easily adjusted toward and from the edge of the jaw 3 according to the width of seam desired.

It will be noted that the simple construction of the device permits the tool to be produced at a small cost and renders it easy of adjustment and at the same time strong and durable.

Having thus described the invention what I claim is:

1. In adjustable tongs of the character described, a pair of jaws, one of the latter having arcuate slots, and the other transverse openings in concentric recesses, disks arranged in said recesses, gage pins projecting from said disks and into the slots of the opposing jaw, pivots for said disks and arranged in the transverse openings of the recessed jaw, and means for drawing said pivots longitudinally to cause them to clamp the disks in adjusted position.

2. In adjustable tongs of the character described, a pair of jaws, one of the latter having arcuate slots, and the other transverse openings in concentric recesses, disks arranged in said recesses, gage pins projecting from said disks and into the slots of the opposing jaw, and clamping pivot bolts in said disks and the openings in the recessed jaw.

3. In adjustable tongs of the character described, a pair of jaws, one of the latter having arcuate slots, and the other transverse openings in concentric recesses, disks arranged in said recesses, gage pins projecting from said disks and into the slots of the opposing jaw, clamping pivot bolts arranged in said disks and the transverse openings of the recessed jaw, said pivot bolts being held against rotation and having wing nuts on their outer ends, the bottoms of the recesses in said jaw being roughened to prevent the disks from slipping when in adjusted position, and coacting scale graduations and pointers on said recessed jaw and disks.

In testimony whereof I hereunto affix my signature in the presence of two witnesses.

SAMUEL HERBERT SMITH.

Witnesses:
  CHARLES M. BROWN,
  EUGENE CAVANAUGH.